United States Patent [19]

Szymanski et al.

[11] 4,041,001

[45] Aug. 9, 1977

[54] WASH-RESISTANT ANTISTATIC COATING COMPOSITIONS

[75] Inventors: Chester D. Szymanski, Martinsville; Ronald DeMartino, Wayne, both of N.J.

[73] Assignee: National Starch and Chemical Corporation, Bridgewater, N.J.

[21] Appl. No.: 526,820

[22] Filed: Nov. 25, 1974

[51] Int. Cl.$^2$ .............................................. C08L 25/18
[52] U.S. Cl. .......................... 260/29.6 WA; 252/8.7; 260/29.6 SQ; 260/29.6 AT; 260/874; 260/DIG. 17
[58] Field of Search .......... 260/874, 79.3 R, 33.4 PQ, 260/DIG. 15, DIG. 17, 29.6 SQ, 29.6 NR, 29.6 WA, 29.6 ME; 252/8.7

[56] References Cited

U.S. PATENT DOCUMENTS

| | | | |
|---|---|---|---|
| 2,525,691 | 10/1950 | Lee et al. | 260/33.4 PQ |
| 2,670,336 | 2/1954 | Roth | 260/29.6 SQ |
| 2,676,896 | 4/1954 | Cohen et al. | 260/79.3 R |
| 2,691,639 | 10/1954 | Roth | 260/29.6 SQ |
| 2,900,370 | 8/1959 | Wilkinson | 260/29.6 SQ |
| 2,912,413 | 11/1959 | Baer | 260/874 |
| 2,971,947 | 2/1961 | Floria | 260/29.6 SQ |
| 3,035,009 | 5/1962 | Murdock et al. | 260/29.6 WA |
| 3,137,668 | 6/1964 | Kuppers | 260/79.3 R |
| 3,238,141 | 3/1966 | Gatza | 252/316 |
| 3,331,798 | 7/1967 | Hibbard | 260/29.6 SQ |
| 3,657,386 | 4/1972 | Weedon et al. | 260/79.3 R |
| 3,745,116 | 7/1973 | Brindell et al. | 260/DIG. 15 |
| 3,833,457 | 9/1974 | Misumi et al. | 252/8.7 |
| 3,867,319 | 2/1975 | Lundberg | 260/33.6 PQ |
| 3,878,178 | 4/1975 | Guinn et al. | 260/79.3 R |

Primary Examiner—Carman J. Seccuro
Attorney, Agent, or Firm—Thomas B. Graham

[57] ABSTRACT

A method for preparing wash-resistant antistatic synthetic fibrous substrates and compositions utilized therefor are disclosed. The method comprises applying a novel antistatic composition comprising a sulfonated polymer and a polyhydroxy organic compound to a synthetic fibrous substrate, curing the antistatic composition and thereby forming a wash-resistant antistatic coating for the substrate.

4 Claims, No Drawings

WASH-RESISTANT ANTISTATIC COATING COMPOSITIONS

BACKGROUND OF THE INVENTION

This invention relates to a method for providing a wash-resistant antistatic coating for synthetic fibrous materials and to the antistatic coating compositions utilized in the method. More particularly, this invention relates to noval antistatic coating compositions comprising a sulfonated polymer having a molecular weight of at least 20,000 and a polyhydroxy organic compound and a method of preparing wash-resistant antistatic materials utilizing the novel compositions.

In recent years, there have been rapid advances in the development of synthetic resins which are ideally suited for the production of fibrous materials. These resins are highly resistant to acids and alkalies, possess high tensile strength and flexibility, and have a high degree of elasticity. Examples of such resins are the polyolefins, polyesters, polyvinylchlorides, polyacrylonitriles, polyamides, and the like. These synthetic resins, being somewhat hydrophobic, are extremely prone to static charge buildup when they are subjected to friction either during their production and processing or during the service life of the finished article. In order to reduce the static charge buildup, it has been necessary to treat these materials with compositions designed to reduce or eliminate the accumulation of these static charges. To be most effective, these materials should provide continued protection against the charge buildup and, in addition not reduce the tensile strength, flexibility, elasticity, resistance to chemical, bacteriological and other agents as well as other important properties. Heretofore, prior methods, although accomplishing these ends have not provided the means by which the treated fibers retain its antistatic property after repeated washings.

Thus, there exists a need for an antistatic coating composition which, when applied to hydrophobic synthetic materials, is capable of withstanding numerous repeated launderings as well as capable of continuously imparting the desired increased conductivity to the surface of the substrate.

SUMMARY OF THE INVENTION

It is, thus, an object of this invention to provide a wash-resistant antistatic coating for hydrophobic synthetic fibrous materials. It is a further object of this invention to provide improved antistatic hydrophobic fibrous materials which are capable of withstanding repeated launderings.

According to the method of the present invention, improved wash-resistant antistatic synthetic fibrous materials are prepared by (a) applying onto a synthetic fibrous substrate an antistatic composition comprising an aqueous solution of a sulfonated polymer having a molecular weight of at least 20,000 and a water-dispersible polyhydroxy organic compound, and (b) drying the coated substrate and curing the antistatic composition by heating at temperatures ranging from about 120°–250° C. for periods of from about 2 – 25 minutes.

Among the sulfonated polymers found useful in the production of the antistatic coating compositions of this invention are included those polymers which contain mers represented by the following general sturcture:

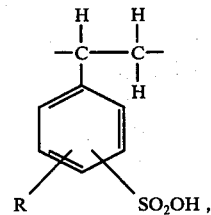

wherein R represents hydrogen or an alkyl group ($C_1$–$C_8$).

With regard to the preparation of the sulfonated polymers described hereinabove, the base polymers may be synthesized by any conventional method, and the sulfonating of the parent compound may be carried out according to the method taught in U.S. Pat. No. 3,072,618. The sulfonated derivatives of these polymers useful in the practice of this invention may have molecular weights between about 20,000 and 7,000,000, preferably between 70,000 and 5,000,000, and a degree of substitution (D.S.) of from about 0.7 to about 1.0, sulfonate or sulfonic acid groups per unit of styrene. These compounds are generally water soluble.

Among the polyhydroxy organic compounds useful in the production of the antistatic compositions of this invention are included the aliphatic diols such as 1,2-ethanediol, 1,3-propanediol, 1,2-propanediol, 1,4-butanediol, 1,6-hexanediol, as well as triols, for example, glycerol, the tetrols such as pentaerythritol and condensation polymers prepared by the reaction of the polyols with ethylene or propylene oxide or mixtures of the polyols and polymers or oligomers so preferred. An example of such a polymer is polyethylene glycol. Also useful are the alkyl substituted polyhydric alcohols of the foregoing classes such as 2,3-dihydroxy-4- methylpentane, and the cyclic polyhydroxy compounds such as cyclopentanediol, cyclohexanediol, and the like. Combinations of aliphatic and cyclic polyhydroxy alcohols; the polyhydroxybenzenes such as 1,2-dihydroxybenzene, 1,3-dihydroxybenzene, 1,4-dihydroxybenzene, and 1,3,5-trihydroxybenzene may also be used. Polymeric polyhydroxy compounds, for example, polyvinyl alcohol are also useful.

With regard to proportions of the two ingredients, the ratio of the sulfonated polymer to the polyhydroxy compound may vary from 1 to 5 and 5 to 1, and preferably from 1 to 2 and 2 to 1, by weight. The compositions are formed by dissolving or dispersing the selected amount of sulfonated polymer and the polyhydroxy compound in water. Ordinarily, the compositions are applied to the substrates having a solids (i.e. active ingredient) content of from about 0.1 to 10%, preferably 0.1 to 4%, by weight. The present antistatic coating compositions are generally applied at coating weights which will provide rapid decay of applied charge. The actual coating weights at which these antistatic compositions will be applied will, of course, vary according to the particular composition utilized, the selected substrate, the specific end use for which the final product is designed.

The present novel antistatic coating compositions may be applied to the substrate by means of any conventional coating technique. Since the adaptibility of a suitable method of coating, notwithstanding the viscosity of the coating composition, with depend, to some extent, on the shape or form of the substrate, selection of a particular technique is left up to the practitioner. Thus, the antistatic coating compositions disclosed herein may be padded or sprayed onto a selected substrate or they may be applied by use of any mechanical coating process such as air knife, trailing blade, knife coater, reverse roller, or gravure coating techniques.

The antistatic coating compositions of this invention may usually be coated at the temperatures at which they are prepared or at ambient temperature, i.e., about 23° C. The practitioner may desire to adjust the viscosity of a fresh or a stored composition in order to facilitate coating.

The antistatic coating compositions of this invention may be coated onto a virtually unlimited variety of solid substrates, including polyester, nylon, glass, fiberglas, acrylic fibers, polyolefins, etc. Furthermore, it is understood that these antistatic compositions may be applied to the substrate which is in the form of a sheet or a thread which is subsequently woven into the finished article, e.g., carpeting, clothing fabric, etc.

Subsequent to application and drying, regardless of the intended use of the substrate, the antistatic coating is thermally cured. This curing within the prescribed temperature range is believed to insolubilize the sulfonated polymeric compound and the polyhydroxy organic compound. The present antistatic compositions, upon being coated, dried, and then cured, are characterized by their antistatic properties and, more importantly, their ability to withstand repeated washings.

In order to cure the antistatic coating compositions of this invention, it is merely necessary to heat the coated composition to a temperature between 120° and 250° C. for periods of from about 2 - 25 minutes. The actual means of curing whether by batch method or any suitable continuous method and the heating time required must be selected so as to accomplish the desired result without incurring any deleterious effects such as those caused by overheating, e.g., the degradation of the polymer, which is often manifested by discoloration and, at times, the concomitant deterioration in the physical properties of the coated composition. On the other hand, inadequate heating of the coated composition will result in producing a non-durable antistatic layer. Obviously, since the method of heating and the duration of the heating period will depend to some extent on the particular composition and the film thickness, the selection of the most suitable curing techniqe is left to the practitioner.

In another aspect of this invention, the antistatic coating compositions intended for use on woven fabrics such as clothing, curtains, etc., may be applied to the thread and subsequently cured before or after weaving.

The following examples will further illustrate the embodiment of our invention.

EXAMPLE I

This example illustrates the preparation of an antistatic coating composition using polyvinyl alcohol in combination with polystyrene sulfonic acid (sulfonated polystyrene) in accordance with this invention.

In this case, the antistatic coating composition comprised an aqueous solution of 1.0 percent, by weight, of the polyvinyl alcohol in combination with the same amount of polystyrene sulfonic acid. Said polyvinyl alcohol had an average molecular weight of about 15,000, and said polystyrene sulfonic acid had an average molecular weight of about 70,000 with a D.S. of 0.97. A test sample bearing a coating of this composition and a series of three controls were prepared as follows:

One of four pieces of 100 percent polyester cloth was dipped in the above described solution and then padded (i.e. passed through the nip of two rollers provided with resilient covers) to remove excess solution and to thereby ensure a uniform coating over the entire surface of the polyester cloth. The coated sample was then air dried, at about 23° C. and cured by heating in an oven set at 130° C. for approximately 25 minutes. The cloth was set aside for the subsequent wash-resistance testing as described hereinbelow.

One of the three remaining pieces of polyester cloth was identified as Control No. 1 and set aside to serve as a non-treated control in the wash-resistance test as set forth below.

Each of the two remaining pieces of polyester cloth were separately coated by the method set forth above, using, in one case, a 1 percent aqueous polystyrene sulfonic acid solution and, in the other, a 1 percent aqueous polyvinyl alcohol solution. In each case, the amount of the particlar ingredient used is given on the basis of the weight of the total solution. Upon being air dried and padded in the manner set forth above, the polyester cloth coated with the polystyrene sulfonic acid solution was identified as Control No. 2 and that coated with the polyvinyl alcohol solution was identified as Control No. 3. Thereafter the surfaces of the three controls and that of the Test Sample were tested in the following manner.

Wash-Resistance Test: The test sample and the three varied controls were first equilibrated at a relative humitidy of 50 percent at 75° F. overnight (about 16 hours). Each cloth was then charged with 100 volts and the charge decay was measured by means of a standard voltmeter. The coated cloths were then subjected to five consecutive detergent wash and rinse cycles and then dried. Thereafter, the cloths were equilibrated in the manner described above, were charged with 100 volts, and the rates of decay of the charges were measured in the same manner as that utilized prior to the washings. The measurements of the rates of charge decay were recorded in terms of time in seconds required for the half life of the applied voltage. The test results are presented below in Table No. 1.

Table No. 1

| Material Tested | Seconds to Half Life | |
| --- | --- | --- |
| | Before Washings | After Washings |
| Test Sample | Instantaneous | Instantaneous |
| Control No. 1 | No Decay | No Decay |
| Control No. 2 | Instantaneous | 20 seconds |
| Control No. 3 | No Decay | No Decay |

The data summarized above clearly indicate that only the charge decay of the test sample coating, consisting of the reaction product of the polystyrene and the polyvinyl alcohol, was not affected by the repeated washings. In other words, the coated surface of the test sample, unlike those of the non-coated surface of Control No. 1 and the single component coated surfaces of Controls Nos. 2 and 3, was capable of withstanding the five wash cycles.

EXAMPLE II

This example illustrates the usefulness of relatively small amounts of a sulfonated polystrene and a polyhydroxy compound in the preparation of a wash-resistant antistatic coating composition in accordance with this invention.

The procedural steps outlined in Example I, were repeated using an aqueous solution of 0.5 percent, by weight, of the polystyrene sulfonic acid of 70,000 M.W. and a D.S. of 0.97 in combination with the same amount of polyvinyl alcohol. The wash-resistance test results obtained in the above described manner were comparable to those of the test sample coating in Example I.

EXAMPLE III

This example illustrates the usefulness of a sulfonated polystyrene and a polyhydroxy compound, having relatively low molecular weights, in the preparation of a wash-resistant antistatic composition.

The procedural steps set fourth in Example I were repeated using polystyrene sulfonic acid which had an average molecular weight of about 20,000, a D.S. of 0.45 and polyethylene glycol having an average molecular weight about the same as that of said acid. When tested for its wash-resistant antistatic properties in the manner described in Example I, this composition was found to have a charge decay rate which was almost instantaneous even after five wash cycles.

EXAMPLE IV – VI

These examples illustrate the usefulness of a polyhydroxy compound, having a varied molecular weight, with a high molecular weight sulfonated polystyrene in the preparation of a wash-resistant antistatic coating composition in accordance with this invention.

To make each of three test sample coating compositions designated A, B, and C, an aqueous solution consisting of 1 percent, by weight, of polystyrene sulfonic acid having a molecular weight of 70,000 and the same amount of a polyethylene glycol having a varied molecular weight, was prepared. The molecular weights of the polyethylene glycol used in said samples, A, B, and C were 100,000, 300,000 and 600,000, respectively. Each of these three compositions was then separately coated onto similar pieces of 100 percent polyester cloth, padded, dried and cured as described in Example I. When tested for their abilities to withstand repeated washings as described in Example I, the cured coating compositions herein displayed wash-resistant antistatic properties comparable to those of the test sample of Example I.

EXAMPLE VII

This example further illustrates the usefulness of a high molecular weight polystyrene sulfonic acid with a polyhydroxy organic compound, having a relatively low average molecular weight, in the preparation of a wash-resistant antistatic composition.

The procedural steps outlined in Example I were repeated except a polystyrene sulfonic acid having an average molecular weight of about 7,000,000 was used in place of that having an average molecular weight of 70,000. Upon being tested for its wash-resistant antistatic properties by the method employed in Example I, the resulting composition exhibited a charge decay rate of about 1.2 seconds.

EXAMPLE VIII

Example I was repeated except glycerol was used in the test sample coating composition in lieu of the polyvinyl alcohol. The resulting cured antistatic substrate exhibited wash-resistant antistatic properties comparable to those in the preceding examples.

EXAMPLE IX

In another repetition of Example I, pentaerythritol was substituted for the polyvinyl alcohol. The wash-resistant antistatic properties of the cured coated substrates were comparable to those of the test sample in Example I.

EXAMPLES X – XI

These examples illustrate the ability of a composition, prepared in accordance with this invention, to provide a wash-resistant antistatic coating for various synthetic substrates.

A test coating composition comprising an aqueous solution of 1 percent, by weight, of the total solution of polystyrene sulfonic acid having an average molecular weight of about 70,000 and the same amount of polyethylene glycol having an average molecular weight of about 100,000 was prepared. Said composition was then coated onto two varied substrates, padded, cured, and tested in the manner set forth in Example I. The test results are presented below in Table No. 2.

Table No. 2

| Sample | Substrate | Seconds to Half Life Before Washings | After Washings |
| --- | --- | --- | --- |
| D | An Acrylic Fiber | Instantaneous | 0.9 seconds |
| E | Fiberglas | Instantaneous | Instantaneous |

Based on the above data, it is thus seen that the wash-resistant antistatic coating composition prepared in accordance with this invention is readily adapted for use on various synthetic substrated.

EXAMPLE XII

This example further illustrates the ability of a composition prepared in accordance with this invention to provide a wash-resistant coating for nylon.

Example I was repeated using nylon cloth as the substrate instead of the polyester cloth. A charge decay rate of 1.7 seconds was obtained after five washing of the treated swatch.

EXAMPLE XIII

In further tests essentially repeating the procedure of Example I, compositions of sulfonated polystyrene (such as used in Example I) and pentaerythritol were prepared utilizing 2%, 4%, 6%, 8%, and 10%, by weigh, of the two components. On evaluation of the test compositions coated on polyester fabric against uncoated controls utilizing one wash cycle, the test swatches showed significantly superior antistatic properties over the controls in all instances.

EXAMPLE XIV

This example illustrates the ability of an antistatic coating composition prepared in accordance with this invention to withstand a greater number of consecutive washings than those of the preceding examples.

The procedural steps of Example I were repeated, however, a polystyrene sulfonic acid having an average molecular weight of about 70,000 and a polyethylene glycol having an average molecular weight of about 20,000 were used, and the coated pieces of polyester cloth were subjected to 20 wash cycles. When tested for its antistatic properties in the manner described in Example I, this coating composition showed a charge decay rate of 3 seconds.

EXAMPLE XV

This example illustrates antistatic compositions prepared using varying proportions of sulfonated polystyrene and pentaerythritol and evaluated on polyester.

Four test compositions were prepared (designated A, B, C, and D) using sulfonated polystyrene having an average molecular weight of about 70,000 and pentaerythritol with concentrations as shown below.

| Composition | Proportion |
|---|---|
| (A) 2½% sulfonated polystyrene, ½% pentarythritol | 5:1 |
| (B) 2% sulfonated polystyrene, 1% pentarythritol | 2:1 |
| (C) 1½sulfonated polystyrene, 1½% penta-erythritol | 1:1 |
| (D) ½% sulfonated polystyrene, 2½% penta-erythritol | 1:5 |

The compositions were added onto test swatches of polyester, dried and cured by heating at 130° C. for 30 minutes. Thereafter the swatches were conditioned and the compositions were evaluated with respect to their antistatic properties before washing and after five washings as described in Example I with the results obtained being summarized in the table below.

Table No. 3

| Composition | Seconds to Half Life | |
|---|---|---|
| | Before Washings | After Washings |
| (A) | 1.0 | 0.9 |
| (B) | 2.3 | 1.9 |
| (C) | 0.3 | 0.3 |
| (D) | 0.3 | 0.3 |

Summarizing, it is thus seen that this invention provides a novel and economic means for providing a wash-resistant antistatic coating composition for synthetic materials. Furthermore, this invention provides wash-resistant antistatic coating compositions for synthetic materials.

Variations may be made of proportions, procedures, and materials without departing from the scope and spirit of this invention which is defined by the following claims.

We claim:

1. An antistatic coating composition consisting essentially of an aqueous solution of a combination of water dispersible polyhydroxy organic compound selected from the group consisting of aliphatic diols, triols and tetrols and their condensation polymers, cyclic diols and triols and polymeric polyhydroxy compounds; and polystryene sulfonic acid having a degree of substitution of from about 0.7 to 1.0 and an average molecular weight of from about 20,000 to 7,000,000, said polyhydroxy compound and said polystryene sulfonic acid each being present in a concentration of from about 0.1 to 10.0%, by weight, and a ratio of from 1 to 5 and 5 to 1, by weight.

2. The coating composition of claim 1 wherein the polystyrene sulfonic acid has an average molecular weight of from about 70,000 to 5,000,000 and is present in a concentration of from about 0.1 to 4.0%, by weight.

3. The coating composition of claim 1 wherein the polyhydroxy compound is selected from the group consiting of 1,2-ethanediol, 1,3-propanediol, 1,2-propanediol, 1,4-butanediol, 1,6-hexanediol, neopentyldiol, glycerol, pentaerythritol, 2,3-dihydroxy-4-methylpentane, cyclopentanediol, cyclohexanediol, 1,2-dihydroxybenzene, 1,4-dihydroxybenzene, 1,3,5-trihydroxybenzene, polyvinyl alcohol and polyethylene glycol.

4. The coating composition of claim 2 wherein the polyhydroxy compound is glycerol or pentaerythritol.

* * * * *